US010908592B2

(12) United States Patent
Fukushima et al.

(10) Patent No.: US 10,908,592 B2
(45) Date of Patent: Feb. 2, 2021

(54) LASER MACHINING METHOD, CONTROLLER, AND ROBOT SYSTEM

(71) Applicant: KABUSHIKI KAISHA YASKAWA DENKI, Kitakyushu (JP)

(72) Inventors: Seiichiro Fukushima, Kitakyushu (JP); Takashi Motoyoshi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 154 days.

(21) Appl. No.: 16/186,675

(22) Filed: Nov. 12, 2018

(65) Prior Publication Data
US 2019/0146460 A1    May 16, 2019

(30) Foreign Application Priority Data

Nov. 13, 2017 (JP) ................. 2017-218510

(51) Int. Cl.
| G05B 19/4155 | (2006.01) |
| G05B 19/416 | (2006.01) |
| B23K 26/08 | (2014.01) |
| B23K 26/082 | (2014.01) |
| B23K 26/06 | (2014.01) |

(52) U.S. Cl.
CPC ...... *G05B 19/4155* (2013.01); *B23K 26/0626* (2013.01); *B23K 26/082* (2015.10); *B23K 26/0884* (2013.01); *G05B 19/416* (2013.01); *G05B 2219/45104* (2013.01); *G05B 2219/45165* (2013.01)

(58) Field of Classification Search
None
See application file for complete search history.

(56) References Cited

U.S. PATENT DOCUMENTS

| 2012/0255938 A1 | 10/2012 | Oe et al. |
| 2014/0217076 A1 | 8/2014 | Oe et al. |
| 2016/0354867 A1 | 12/2016 | Matsuoka et al. |
| 2017/0182599 A1 | 6/2017 | Tsukui |

FOREIGN PATENT DOCUMENTS

| CN | 102728952 A | 10/2012 |
| CN | 105555465 A | 5/2016 |
| DE | 10 2007 063 456 A1 | 11/2008 |
| EP | 3 020 502 A1 | 5/2016 |
| JP | 4-220190 A | 8/1992 |

(Continued)

OTHER PUBLICATIONS

Extended European Search Report dated Apr. 18, 2019 in Patent Application No. 18205907.1, 8 pages.

(Continued)

*Primary Examiner* — Carlos R Ortiz Rodriguez
(74) *Attorney, Agent, or Firm* — Oblon, McClelland, Maier & Neustadt, L.L.P.

(57) ABSTRACT

A laser machining method includes obtaining attribute information indicating a distribution of an attribute of a workpiece in a machined area of the workpiece, dividing a shape of a radiation locus into divided areas, and adjusting, based on the attribute information and in each of the divided areas, at least one of a locus velocity of a laser from a head configured to variably make the radiation locus on the workpiece using the laser, and an output of the laser from the head. The head is moved by a robot configured to move the head.

15 Claims, 8 Drawing Sheets

(56) References Cited

FOREIGN PATENT DOCUMENTS

| | | |
|---|---|---|
| JP | 2012-218029 A | 11/2012 |
| JP | 2017-039145 A | 2/2017 |
| WO | WO 2015/129248 A1 | 9/2015 |

OTHER PUBLICATIONS

Japanese Office Action dated Jan. 7, 2020, in Patent Application No. 2017-218510, 9 pages (with unedited computer generated English translation).

Combined Chinese Office Action and Search Report dated May 20, 2020, in Patent Application No. 201811009307.2 (with English translation), 17 pages.

Office Action dated Oct. 13, 2020 in Chinese Patent Application No. 201811009307.2 (with English translation); 10 pgs.

FIG. 6C

|    | xmin | ymin | xmax | ymax | Locus velocity | Intensity | Frequency | Duty |
|----|------|------|------|------|----------------|-----------|-----------|------|
| A1 | -100 | 0    | 100  | 100  | 500            | 6000      | 0         | 0    |
| A2 | -100 | -100 | 0    | 0    | 500            | 4000      | 0         | 0    |
| A3 | 0    | -100 | 100  | 0    | 400            | 5000      | 1000      | 50   |

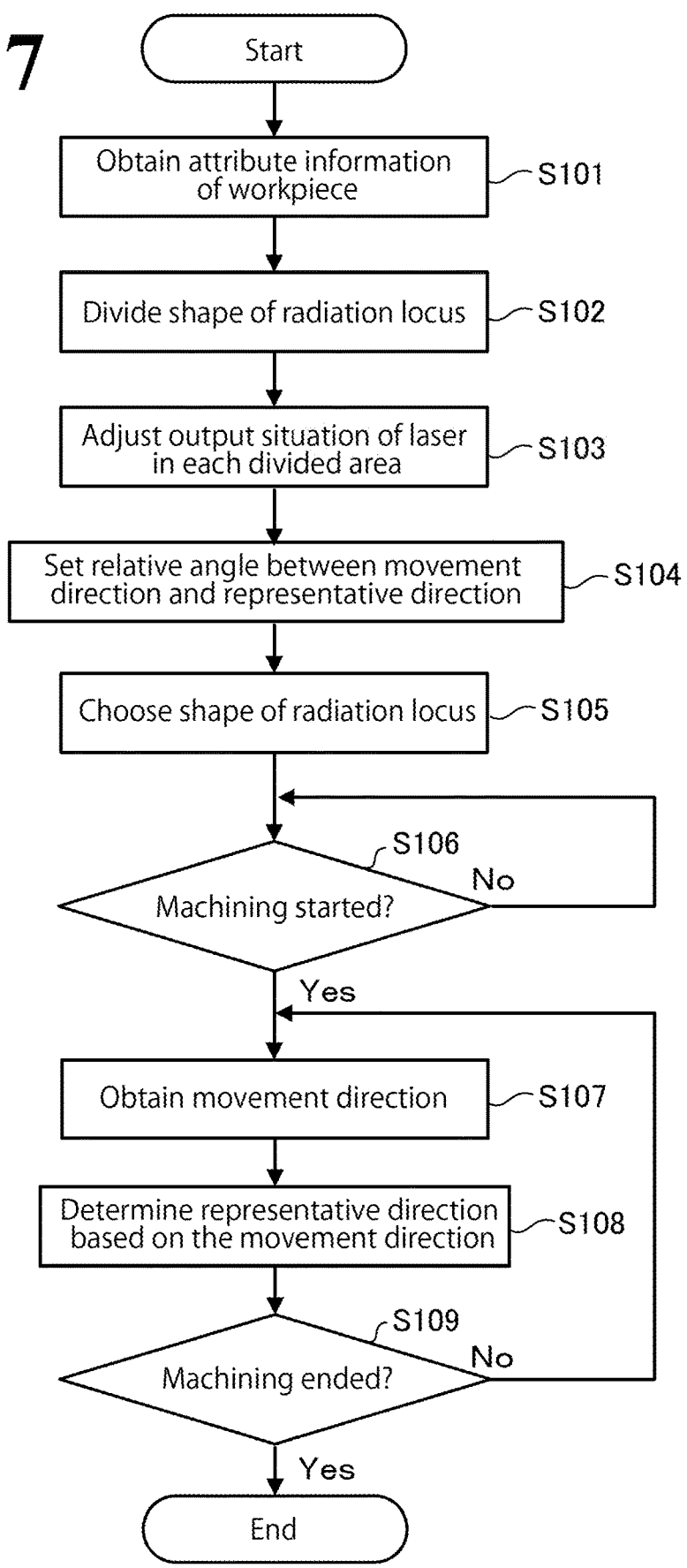

US 10,908,592 B2

LASER MACHINING METHOD, CONTROLLER, AND ROBOT SYSTEM

CROSS-REFERENCE TO RELATED APPLICATIONS

The present application claims priority under 35 U.S.C. § 119 to Japanese Patent Application No. 2017-218510, filed Nov. 13, 2017. The contents of this application are incorporated herein by reference in their entirety.

BACKGROUND

Field of the Invention

The embodiments disclosed herein relate to a laser machining method, a controller, and a robot system.

Discussion of the Background

Some robots known in the art make a motion by driving a plurality of joints. Such robot includes an end effector mounted at the leading end of the robot. The end effector varies depending on the application in which the robot is used, such as machining and welding, so that the robot is capable of performing various kinds of work such as machining and welding a workpiece.

JP 2017-039145A discloses an end effector for use in laser welding. The end effector uses different heat input amounts of laser welding along a welding locus. Specifically, the heat input amount used at a start portion and an end portion of the welding locus is different from the heat input amount used at other portions of the welding locus.

SUMMARY

According to one aspect of the present invention, a laser machining method includes obtaining attribute information indicating a distribution of an attribute of a workpiece in a machined area of the workpiece, dividing a shape of a radiation locus into divided areas, and adjusting, based on the attribute information and in each of the divided areas, at least one of a locus velocity of a laser from a head configured to variably make the radiation locus on the workpiece using the laser, and an output of the laser from the head. The head is moved by a robot configured to move the head.

According to another aspect of the present invention, an apparatus that controls a motion of a head that variably makes a radiation locus on a workpiece using a laser includes circuitry that obtains attribute information indicating a distribution of an attribute of the workpiece in a machined area of the workpiece, divide a shape of the radiation locus into divided areas, and adjust, based on the attribute information and in each of the divided areas, at least one of a locus velocity of the laser from the head and an output of the laser from the head.

According to yet another aspect of the present invention, a robot system robot system includes a head that variably makes a radiation locus on a workpiece using laser, a robot that moves the head, and an apparatus that controls a motion of the head and includes circuitry that obtains attribute information indicating a distribution of an attribute of the workpiece in a machined area of the workpiece, divide a shape of the radiation locus into divided areas, and adjust, based on the attribute information and in each of the divided areas, at least one of a locus velocity of the laser from the head and an output of the laser from the head.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6C is a table of setting items of divided areas; and

FIG. 7 is a flowchart of a procedure for processing performed by the robot system;

DESCRIPTION OF THE EMBODIMENTS

By referring to the accompanying drawings, a laser machining method, a controller, and a robot system according to embodiments of the present disclosure will be described in detail below. It is noted that the following embodiments are provided for example purposes only and are not intended for limiting purposes. Also, while in the following description laser welding is taken as an example of laser machining, it is also possible to change the roughness of a workpiece, form a groove on a workpiece, or draw a picture on a workpiece.

Also in the following description, terms such as "constant", "orthogonal", "perpendicular", and "parallel" may not necessarily be used in a strict sense. That is, these terms are used with production-related and installation-related tolerances and errors taken into consideration.

Figure 1:
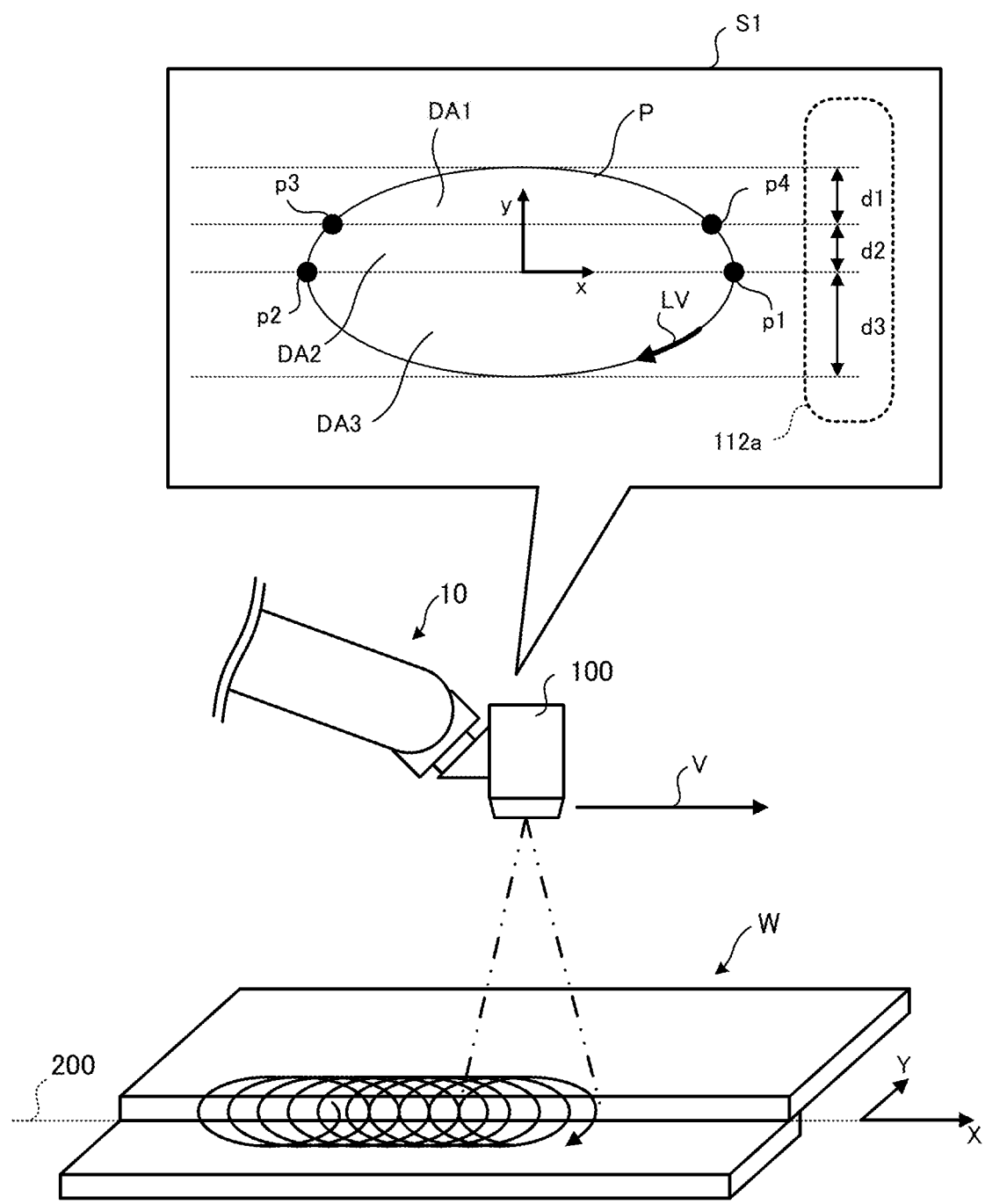
FIG. 1 illustrates an outline of a laser machining method according to an embodiment.

A laser machining method according to this embodiment will be outlined by referring to FIG. 1. FIG. 1 illustrates an outline of the laser machining method according to this embodiment. As illustrated in FIG. 1, a head 100, which performs laser machining, is mounted on the leading end of a robot 10. FIG. 1 also illustrates an xy coordinate system, which is fixed to the head 100, and an XY coordinate system, which is fixed to a workpiece W.

As illustrated in FIG. 1, the robot 10 moves the head 100 along a machining line 200. The machining line 200 is set on the workpiece W. As used herein, the machining line 200 refers to an imaginary line set along the extending direction of a machining area of the workpiece W. In the embodiment of FIG. 1, the workpiece W is made up of two partially overlapping plates. The machining line 200 is set along the boundary line between the upper plate and the lower plate.

The head 100 includes a unit of mechanism such as a mirror galvanometer for changing the direction of laser radiation. Specifically, two mirrors swingable about different axes are independently driven to change the direction of laser radiation in a desired manner.

That is, the head 100 is capable of causing the two mirrors to cooperate with each other to make any desired shape of a radiation locus P. The head 100 is also capable of changing a representative direction PV (see FIG. 5) in which the shape of the radiation locus P is pointed.

At step S1 illustrated in FIG. 1, the head 100 radiates laser to make the radiation locus P. The radiation locus P illustrated in FIG. 1 corresponds to one round of laser radiation on a plane on which the workpiece W is projected (for example, a plane parallel to the upper surface of the workpiece W). In the embodiment of FIG. 1, the radiation locus P has an ellipse shape. In the case where the radiation locus P has an ellipse shape as in this embodiment, when the robot 10 makes a motion to move the head 100 along the machining line 200 in movement direction V, the radiation locus P at step S1 is synthesized with the movement direction V, forming a spiral as illustrated in FIG. 1.

In the embodiment of FIG. 1, the thickness of the workpiece W varies from portion to portion of the workpiece W. In this case, if the output from the head 100 is uniform throughout the workpiece W, a lack of penetration or a burn-through may occur at some portions of the workpiece W.

In light of the circumstances, the laser machining method according to this embodiment includes obtaining attribute information 112a. The attribute information 112a indicates a distribution of an attribute of the workpiece W in a machined area of the workpiece W. The laser machining method according to this embodiment also includes adjusting, based on the obtained attribute information 112a, at least one of the locus velocity, LV, of laser from the head 100 and the output of laser from the head 100.

Referring to step S1 illustrated in FIG. 1, description will be made with regard to an example case where the attribute information 112a indicates a distribution of the thickness of the workpiece W. In the embodiment of FIG. 1, the thickness of the workpiece W is distributed in three ways (thickness d1, thickness d2, and thickness d3) over sections indicated by three double-headed arrows pointed in directions along the y axis. The thickness d2 is larger than the thickness d1, and the thickness d1 is equal to the thickness d3.

In this case, in the laser machining method according to this embodiment, the radiation locus P is divided into: divided area DA1, which corresponds to the thickness d1; divided area DA2, which corresponds to the thickness d2; and divided area DA3, which corresponds to the thickness d3. That is, the shape of the radiation locus P is divided into a plurality of divided areas based on the attribute information 112a. In the following description, where it is not necessary to distinguish the divided areas from each other, the divided areas will be collectively referred to as "divided areas DA" or "divided area DA".

Then, in the laser machining method according to this embodiment, at least one of the locus velocity LV of the laser from the head 100 and the output of laser from the head 100 is adjusted in each of the divided areas DA (on an individual-divided-area-DA basis). In the embodiment of FIG. 1, the locus velocity LV in the divided area DA2, which corresponds to the thickness d2, is made lower than the locus velocity LV in the other divided areas DA, or the output of the laser in the divided area DA2 is made larger than the output of laser in the other divided areas DA.

For example, assume that points at which the radiation locus P intersects with the divided areas DA are denoted point p1, point p2, point p3, and point p4, which are aligned in the direction of the locus velocity LV. In this case, the locus velocity, LV2, directed from the point p2 to the point p3 is lower than the locus velocity, LV1, directed from the point p to the point p2. The locus velocity, LV3, directed from the point p3 to the point p4 is equal to the locus velocity LV1. The locus velocity, LV4, directed from the point p4 to the point p is equal to the locus velocity LV2.

With this configuration, the laser machining method according to this embodiment makes machining quality less likely to vary, even when an attribute of a workpiece varies from portion to portion of the workpiece. That is, the laser machining method according to this embodiment maintains quality of laser machining.

While in FIG. 1 the attribute information 112a indicates a distribution of the thickness of the workpiece W, this configuration is not intended as limiting the attribute information 112a. For example, the attribute information 112a may be a distribution associated with a surface state of the workpiece W, such as a distribution of material, a distribution of temperature, and a distribution of roughness. For further example, the attribute information 112a may be a distribution associated with a machining state of the workpiece W, such as a distribution of a machining state of a groove. For further example, the attribute information 112a may be a combination of the foregoing types of distribution.

While in FIG. 1 the radiation locus P is divided into the divided areas DA along lines parallel to the x axis based on the attribute information 112a, the shapes of the divided areas DA may vary depending on a distribution of an attribute of the workpiece W. A case where the machining line 200 is curved will be described later by referring to FIG. 5.

Figure 2:
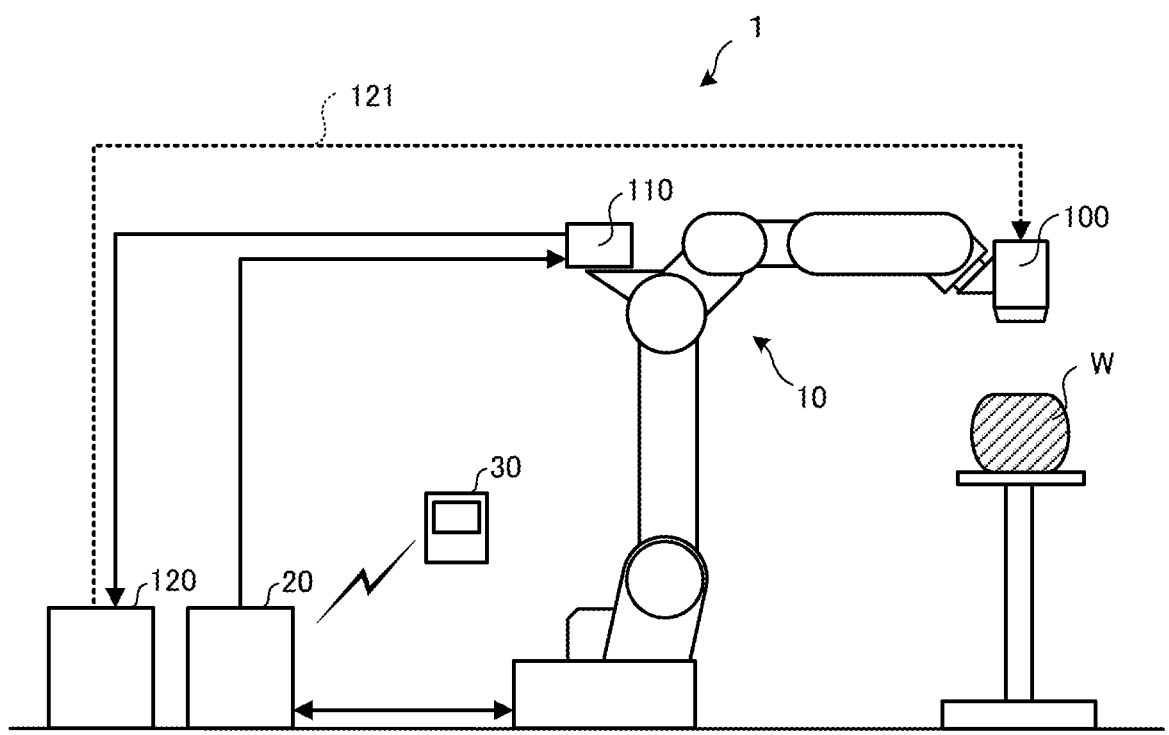
FIG. 2 illustrates how elements of a robot system are connected to each other.

The laser machining method described above by referring to FIG. 1 can be performed by a robot system 1. By referring to FIG. 2, description will be made with regard to how the elements of the robot system 1 are connected to each other. FIG. 2 illustrates how the elements of the robot system 1 are connected to each other. As illustrated in FIG. 2, the robot system 1 includes the robot 10, a robot controller 20, a terminal device 30, the head 100, a head controller 110, and a laser oscillator 120.

It is to be noted that FIG. 2 also illustrates the workpiece W, which is an object machined by the robot system 1. It is also to be noted in the following description that a reference to "the controller" indicates the head controller 110, instead of the robot controller 20.

In this embodiment, the robot 10 is a six-axis vertical multi-articular robot with the head 100 mounted on the leading end of the robot. The robot controller 20 controls motions of the robot 10. Through the robot controller 20, the terminal device 30 transmits setting values or other parameters for the head 100 to the head controller 110 in a wired or wireless manner. The terminal device 30 displays how the shape of the radiation locus P formed at step S1 illustrated in FIG. 1 is divided.

The head controller 110 controls motions of the head 100 based on setting values for the head 100 received through the robot controller 20. The head controller 110 also makes instructions such as a laser intensity instruction to the laser oscillator 120.

Upon receipt of an instruction from the head controller 110, the laser oscillator 120 transmits laser to the head 100 through an optical fiber 121. The elements of the robot system 1 will be described in detail later by referring to FIG. 4.

While in FIG. 2 the head controller 110 and the robot controller 20 are separate structures, the robot controller 20 may incorporate therein the functions of the head controller 110.

Figure 3:
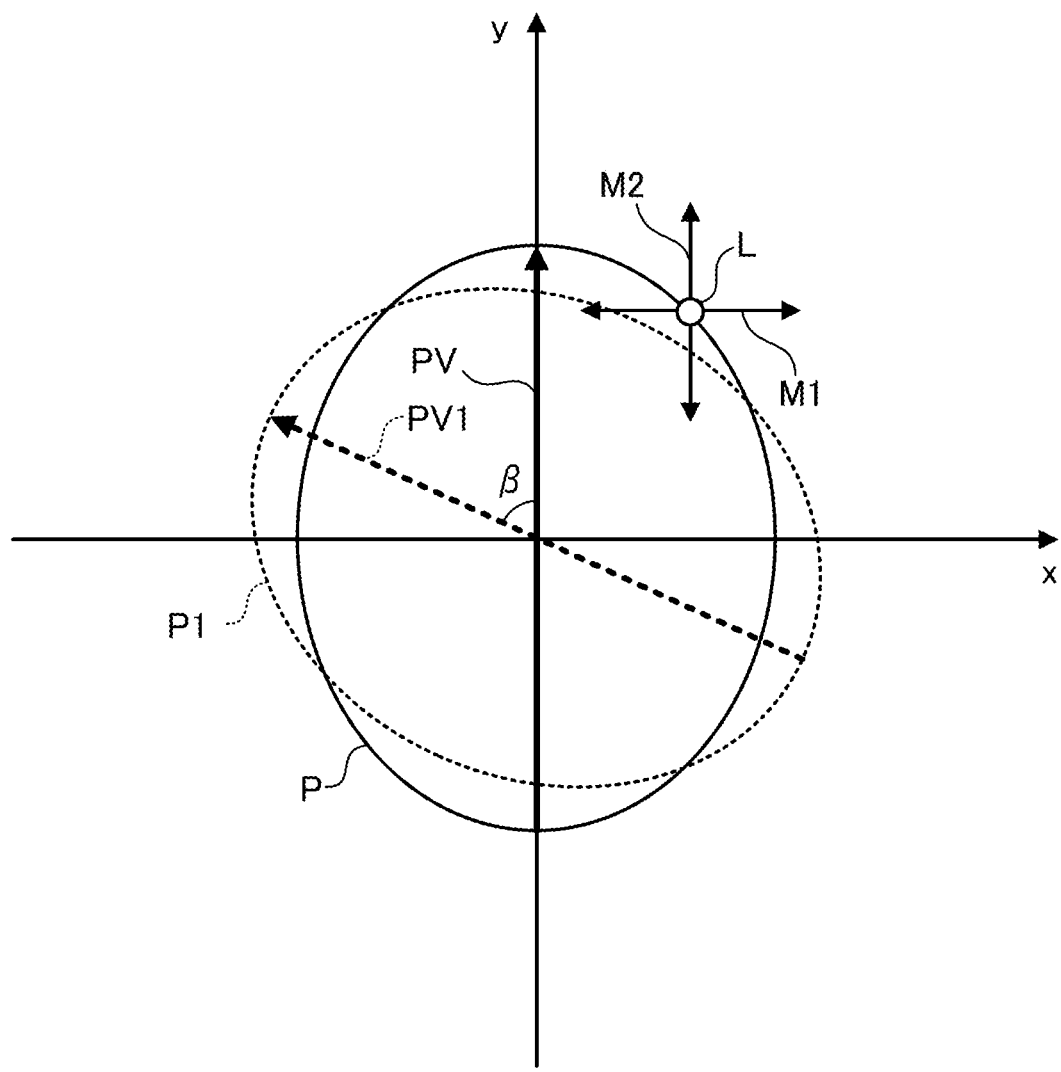
FIG. 3 illustrates how a head makes a motion.

By referring to FIG. 3, how the head 100 (see FIG. 1) makes a motion will be described. FIG. 3 illustrates how the head 100 makes a motion. Specifically, FIG. 3 illustrates an xy coordinate system fixed to the head 100.

FIG. 3 also illustrates a laser radiation point L with swing direction M1 and swing direction M2 of a pair of swingable mirrors. In FIG. 3, the swing direction M1 and the swing direction M2 are orthogonal to each other, the x axis and the swing direction M1 are parallel to each other, and the y axis and the swing direction M2 are parallel to each other.

As illustrated in FIG. 3, the head 100 moves the laser radiation point L in the swing direction M1 and the swing direction M2. By combining the motion in the swing direction M1 and the motion in the swing direction M2, the locus of motion of the radiation point L, that is, the radiation locus P can have any shape.

In the embodiment of FIG. 3, the radiation locus P has an ellipse shape, similarly to the radiation locus P illustrated in FIG. 1, and the representative direction PV of the radiation locus P is parallel to the longitudinal axis of the ellipse shape. Also in FIG. 3, the representative direction PV matches the y axis. The head 100 adjusts the displacement in the swing direction M1 and the displacement in the swing direction M2 in a desired manner to turn the radiation locus P by a desired angle while maintaining the shape of the radiation locus P.

In the embodiment of FIG. 3, the radiation locus P is turned counter-clockwise by an angle of β, resulting in a radiation locus P1 as indicated by a broken line. Also as illustrated in FIG. 3, the representative direction PV of the radiation locus P is turned by an angle of β, resulting in a representative direction PV1 as indicated by a broken line arrow. By changing the angle β to a desired angle, the head 100 is able to turn the radiation locus P and the representative direction PV by a desired angle.

That is, by turning the radiation locus P by a desired angle, the head 100 is able to change the representative direction PV of the radiation locus P by a desired angle without changing the posture of the head 100. While in FIG. 3 the shape of the radiation locus P is an ellipse, the radiation locus P may have any of other various shapes, such as a triangular shape, a rectangular shape, and a linear shape. That is, the shape of the radiation locus P may be any shape that can be drawn unicursally. In the case of a linear shape, the laser radiation point L makes a reciprocating motion between one end and the other end of the linear shape.

Figure 4:
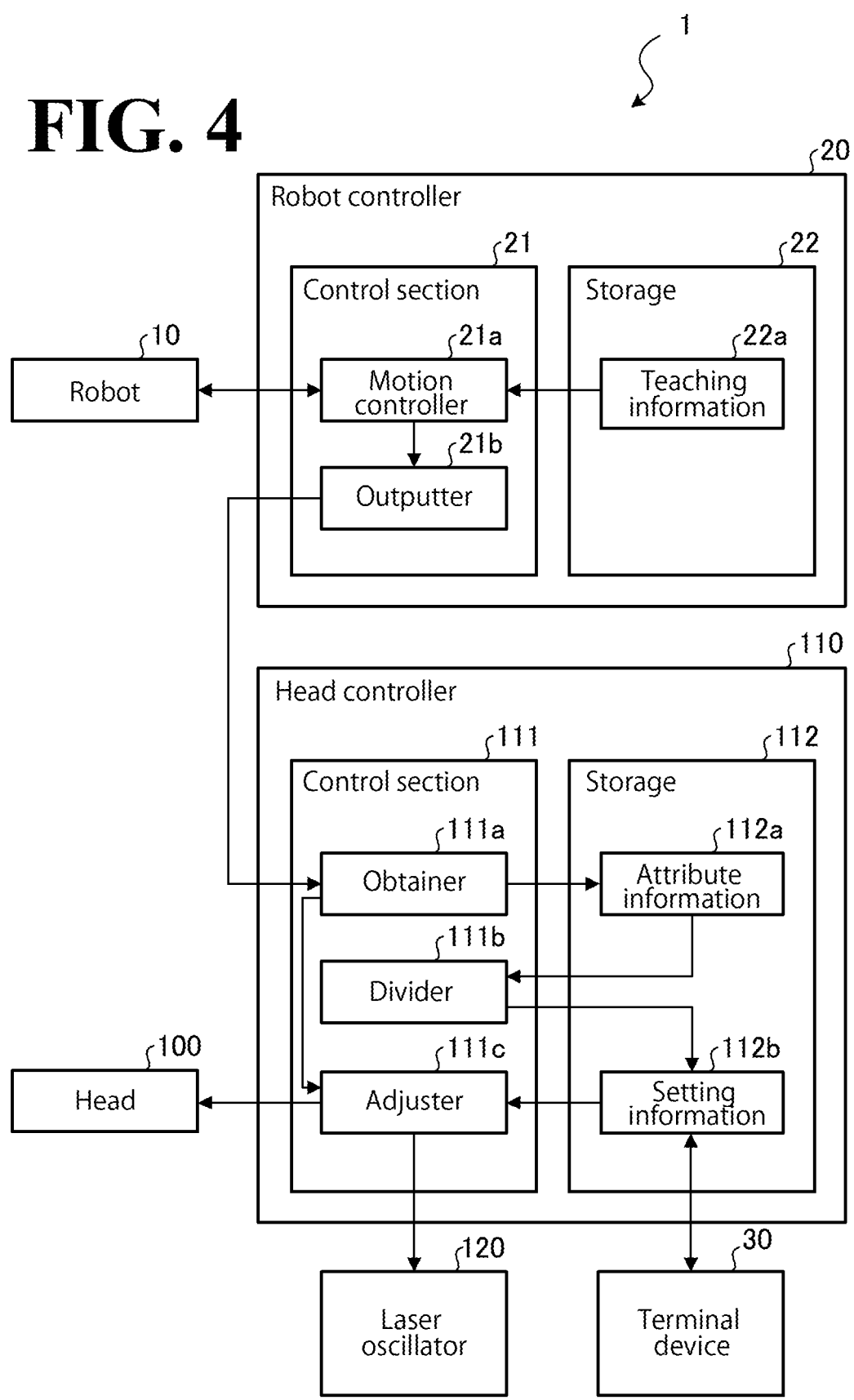
FIG. 4 is a block diagram illustrating a configuration of the robot system.

Now that how the elements of the robot system 1 are connected each other has been described by referring to FIG. 2, a configuration of the robot system 1 will be described in more detail below by referring to FIG. 4. FIG. 4 is a block diagram illustrating a configuration of the robot system 1. As illustrated in FIG. 4, the robot system 1 includes the robot 10, the robot controller 20, the terminal device 30, the head 100, the head controller 110, and the laser oscillator 120.

For simplicity of description, the terminal device 30 directly communicates with the head controller 110 in FIG. 4. In another possible embodiment, the terminal device 30 may indirectly communicate with the head controller 110 through the robot controller 20. Also, the following description is mainly regarding a configuration of the robot controller 20 and a configuration of the head controller 110.

A configuration of the robot controller 20 will be described first. The robot controller 20 is connected to the robot 10 and the head controller 110. The robot controller 20 controls motions of the robot 10 and transmits to the head controller 110 information used in motion control of the head 100.

Specifically, the robot controller 20 includes a control section 21 and a storage 22. The control section 21 includes a motion controller 21a and an outputter 21b. The storage 22 stores teaching information 22a. The robot controller 20 includes a computer and various circuits. The computer includes a central processing unit (CPU), a read only memory (ROM), a random access memory (RAM), a hard disk drive (HDD), and input-output ports.

The CPU of the computer reads programs stored in the ROM and executes the programs to serve the functions of the motion controller 21a and the outputter 21b of the control section 21. At least one or all of the motion controller 21a and the outputter 21b may be implemented by hardware such as ASIC (Application Specific Integrated Circuit) and FPGA (Field Programmable Gate Array).

The storage 22 corresponds to the RAM and/or the HDD. The RAM and the HDD are capable of storing the teaching information 22a. It will be understood by those skilled in the art that the robot controller 20 may obtain the above-described programs and various kinds of information from another computer connected to the robot controller 20 through a wired or wireless network or from a portable recording medium.

Based on the teaching information 22a, the motion controller 21a controls the robot 10 to make a motion. The teaching information 22a is prepared in the teaching stage, in which the robot 10 is taught a motion, and includes "jobs" that constitute a program defining a motion path of the robot 10.

When the motion of the robot 10 to change the posture of the head 100 and the motion of the head 100 to change the representative direction PV of the radiation locus P are available, the robot system 1 prioritizes the motion of the head 100.

That is, when securing a constant relative angle between the representative direction PV and the movement direction V of the radiation locus P is viable by causing the head 100 to make a motion, the teaching information 22a includes a content specifying that the robot 10 does not change the posture of the head 100.

The motion controller 21a calculates the movement direction V of the head 100 mounted on the robot 10 and calculates the posture of the head 100. In such an application that the movement direction V of the head 100 is represented using a coordinate system fixed to the head 100, the calculation of the posture of the head 100 may be omitted. The motion controller 21a performs feedback control using an encoder value from an actuator such as a motor that provides motive power to the robot 10. In this manner, the motion controller 21a improves the motion accuracy of the robot 10.

After the motion controller 21a has calculated the movement direction V of the head 100 and the posture of the head 100, the outputter 21b outputs the movement direction V, the posture of the head 100, and the attribute information 112a illustrated in FIG. 1 to the head controller 110. Assume here that the attribute information 112a has been transmitted in advance from the terminal device 30 to the robot controller 20.

When the motion controller 21a causes the robot 10 to make a motion to keep a constant posture of the head 100 relative to the workpiece W (see FIG. 1), the outputter 21b may omit the output of the posture of the head 100. The outputter 21b may also omit the output of the posture of the head 100 when the movement direction V of the head 100 is represented on a coordinate system fixed to the head 100.

A configuration of the head controller 110 will be described. The head controller 110 is connected to the head 100, the laser oscillator 120, and the terminal device 30.

From the terminal device 30, the head controller 110 receives the radiation locus P made by the head 100, the representative direction PV of the radiation locus P, how the shape of the radiation locus P is divided, and setting information 112b, which is associated with laser intensity. The head controller 110 may be similar to the robot controller 20 in hardware configuration and software configuration.

From the robot controller 20, the head controller 110 receives the movement direction V of the head 100, the posture of the head 100, and the attribute information 112a. Then, the head controller 110 controls motions of the head 100 based on the setting information 112b and other information received from the terminal device 30 and the robot controller 20.

Specifically, the head controller 110 includes a control section 111 and a storage 112. The control section 111 includes an obtainer 111a, a divider 111b, and an adjuster 111c. The storage 112 stores the attribute information 112a and the setting information 112b.

From the robot controller 20, the obtainer 111a receives the movement direction V of the head 100, the posture of the head 100, and the attribute information 112a. Then, the obtainer 111a forwards the received information to the adjuster 111c. The obtainer 111a also records the obtained attribute information 112a in the storage 112.

The divider 111b divides the radiation locus P into the plurality of divided areas DA (see FIG. 1) based on the attribute information 112a stored in the storage 112. Specifically, the divider 111b divides the radiation locus P into a plurality of divided areas DA so that the attribute of the workpiece W is in a different state in each of the plurality of divided areas DA. Then, the divider 111b updates the setting information 112b based on attribute information 112a indicating the state of the attribute in each divided area DA. Example divided areas DA made by the divider 111b will be described later by referring to FIG. 6B.

The adjuster 111c controls motions of the head 100 based on: the movement direction V of the head 100 received from the obtainer 111; the posture of the head 100 received from the obtainer 111a; and the setting information 112b.

Specifically, in the case where the robot controller 20 is controlling the robot 10 to make a motion to keep a constant posture of the head 100 relative to the workpiece W, the adjuster 111c adjusts the motion of the head 100 based on the movement direction V of the head 100 received from the robot controller 20. By adjusting the motion of the head 100 in this manner, the adjuster 111c makes a constant angle of α (see FIG. 5) between the movement direction V of the head 100 and the representative direction PV of the radiation locus P.

In the case where the robot controller 20 is not controlling the robot 10 to make a motion to keep a constant posture of the head 100 relative to the workpiece W, the adjuster 111b adjusts the motion of the head 100 based on the posture of the head 100 and the movement direction V of the head 100 received from the robot controller 20. By adjusting the motion of the head 100 in this manner, the adjuster 111b makes a constant angle of α (see FIG. 5) between the movement direction V of the head 100 and the representative direction PV of the radiation locus P.

When, as described above, the movement direction V of the head 100 is represented on a coordinate system fixed to the head 100, the adjuster 111b may adjust the motion of the head 100 to keep a constant angle of α (see FIG. 1) between the movement direction V and the representative direction PV of the radiation locus P. That is, the adjuster 111b is able to adjust the motion of the head 100 without using the posture of the head 100.

The adjuster 111c transmits to the laser oscillator 120a change instruction for change of laser intensity or similar parameter based on: the setting information 112b; and the attribute information 112a that indicates the state of the attribute in each divided area DA and that is reflected in the setting information 112b. The laser oscillator 120 provides the head 100 with a level of laser corresponding to the change instruction from the adjuster 111c. The adjuster 111c also transmits to the head 100a change instruction for change of the radiation locus P (see FIG. 1) including change of the locus velocity LV.

The terminal device 30 is a computer that includes an input-output device, such as a touch panel display, and a wired or wireless communication device. The terminal device 30 displays a content of the setting information 112a and an input-output screen on which the content can be corrected or changed and on which new information can be input.

Figure 5:
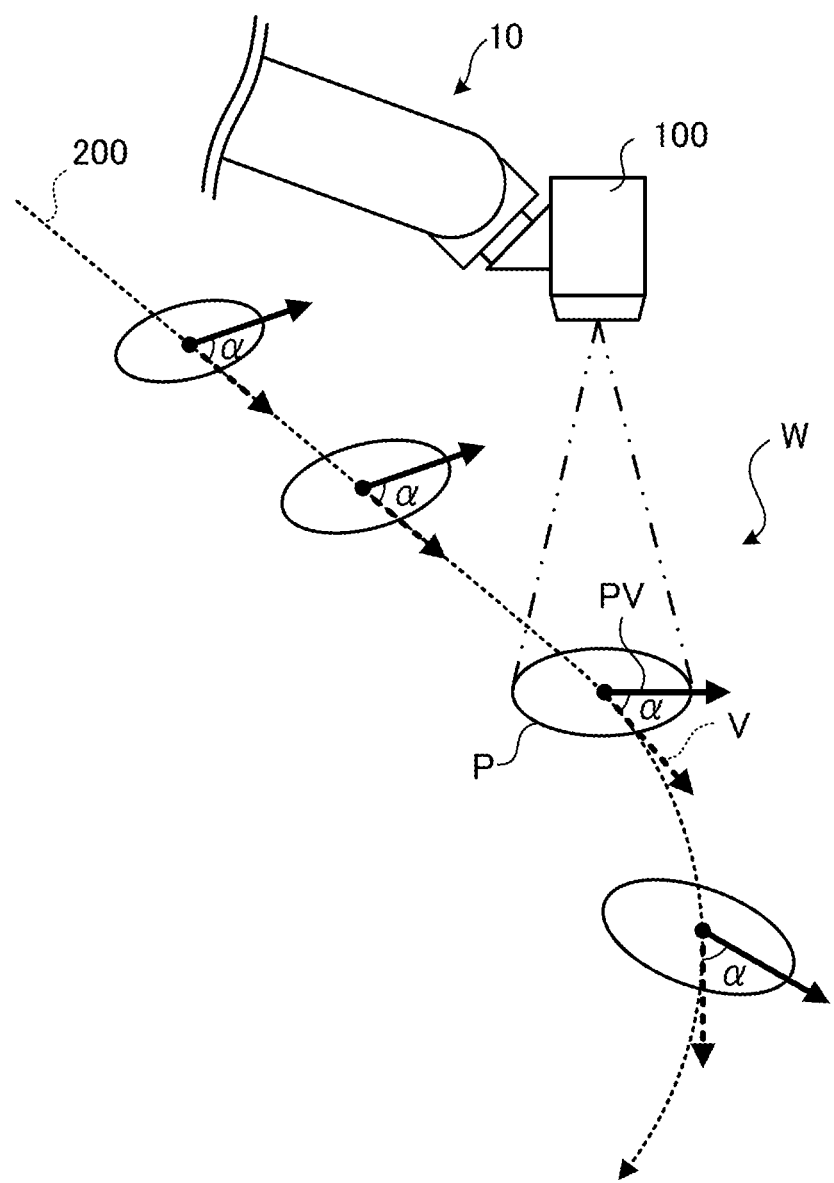
FIG. 5 illustrates adjustment processing of adjusting a representative direction a shape of a radiation locus.

By referring to FIG. 5, description will be made with regard to adjustment processing of adjusting the representative direction PV of the shape of the radiation locus P. FIG. 5 illustrates adjustment processing of adjusting the representative direction PV of the shape of the radiation locus P. FIG. 5 is similar to FIG. 1 in that the head 100, which performs laser machining, is mounted on the leading end of the robot 10.

As illustrated in FIG. 5, the robot 10 moves the head 100 along the machining line 200, which is set on the workpiece W. As illustrated in FIG. 1, the radiation locus P has an ellipse shape, and the representative direction P V is parallel to the longitudinal axis of the ellipse shape.

Also in FIG. 5, movement directions V of the radiation locus P and the head 100 are illustrated at predetermined spatial intervals. It is to be that while the radiation locus P forms a spiral shape in actual situations of the movement of the head 100 along the machining line 200, the radiation locus P is illustrated in the shape of an ellipse for simplicity of description.

As illustrated in FIG. 5, when the direction of the machining line 200 changes, the relative angle of the representative direction PV relative to the movement direction V changes, causing a possibility of a varied machining width over which the workpiece W is machined.

In light of the circumstances, the adjuster 111c of the head controller 110 illustrated in FIG. 4 adjusts the shape of the radiation locus P to keep a constant relative angle between the representative direction PV of the radiation locus P and the movement direction V of the head 100 moving along the machining line 200.

Specifically, even though the head 100 moves along the machining line 200 while maintaining a constant posture relative to the workpiece W, the head 100 changes the direction in which the shape of the radiation locus P is pointed to keep a constant relative angle of α between the movement direction V and the representative direction PV.

This eliminates or minimizes degradation of machining quality even when the machining line 200 is curved, that is, even when the direction of the machining line 200 changes. That is, the laser machining method according to this embodiment maintains laser machining quality.

Also, the robot system 1 (see FIG. 4) prioritizes the motion of the head 100 to change the representative direction PV of the radiation locus P over the motion of the robot 10 to change the posture of the head 100. This eliminates or minimizes vibration in the robot 10 involved with the change of the posture of the head 100, resulting in increased machining accuracy.

Figure 6A:
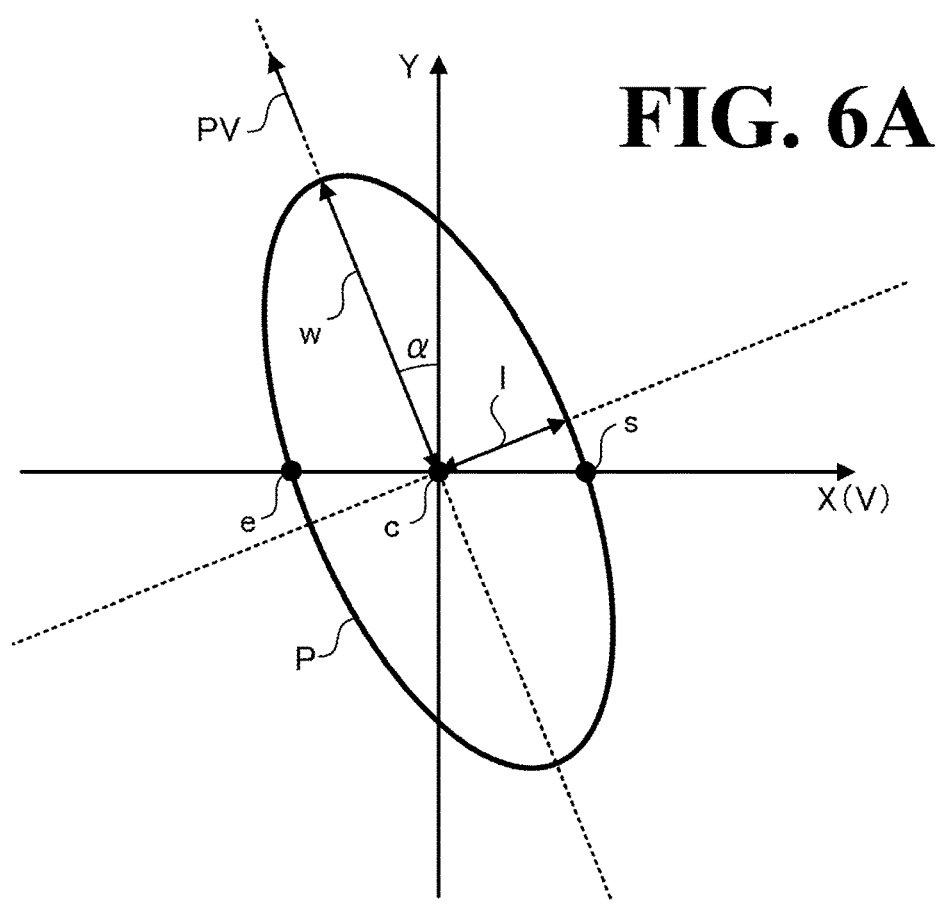
FIG. 6A illustrates setting items of the head.

By referring to FIG. 6A, description will be made with regard to the head 100's setting items included in the setting information 112b (see FIG. 4) illustrated in FIG. 4. FIG. 6A illustrates setting items of the head 100. Specifically, FIG. 6A illustrates an XY coordinate system with the X axis matching the movement direction V.

The XY coordinate system is a coordinate system that is based on the workpiece W, as opposed to the xy coordinate system illustrated in FIG. 3 (coordinate system fixed to the head 100). The robot system 1 may perform control using both an xy coordinate system, with the x axis and the y axis, and an XY coordinate system, with the X axis and the Y axis. In this case, the xy coordinate system and the XY coordinate system are the same coordinate systems.

As illustrated in FIG. 6A, the head 100's setting items include starting phase s, ending phase e, center c, welding width w, progression length l, inclination angle α, and specified shape. Based on these setting items, the radiation locus P and its representative direction PV illustrated in FIG. 6A are determined uniquely. In the embodiment of FIG. 6A, the specified shape is an ellipse shape.

For example, the starting phase s is a counter-clockwise angle relative to the X axis. In the embodiment of FIG. 6A, the starting phase s is 0° (degrees). The ending phase e is a counter-clockwise angle relative to the X axis. In the embodiment of FIG. 6A, the ending phase e is 180° (degrees).

The starting phase s corresponds to the angle at which laser radiation starts, and the ending phase e corresponds to the angle at which laser radiation stops. The center c corresponds to the center of the shape of the radiation locus P. The welding width w corresponds to the width of the shape in the representative direction PV. The progression length l corresponds to the width of the shape in a direction perpendicular to the representative direction PV.

The inclination angle α corresponds to the angle α illustrated in FIG. 5. It is also possible to use the turning direction of the radiation locus P as an additional setting item. In this case, a choice can be made as to whether the radiation locus P turns clockwise or counter-clockwise.

The setting items illustrated in FIG. 6A (the starting phase s, the ending phase e, the center c, the welding width w, the progression length l, and the inclination angle α) may be input through the terminal device 30 illustrated in FIG. 4. While in FIG. 6A the shape of the radiation locus P is an ellipse, the head 100 is capable of making any other various shapes than an ellipse for the radiation locus P, as described above.

Figure 6B:
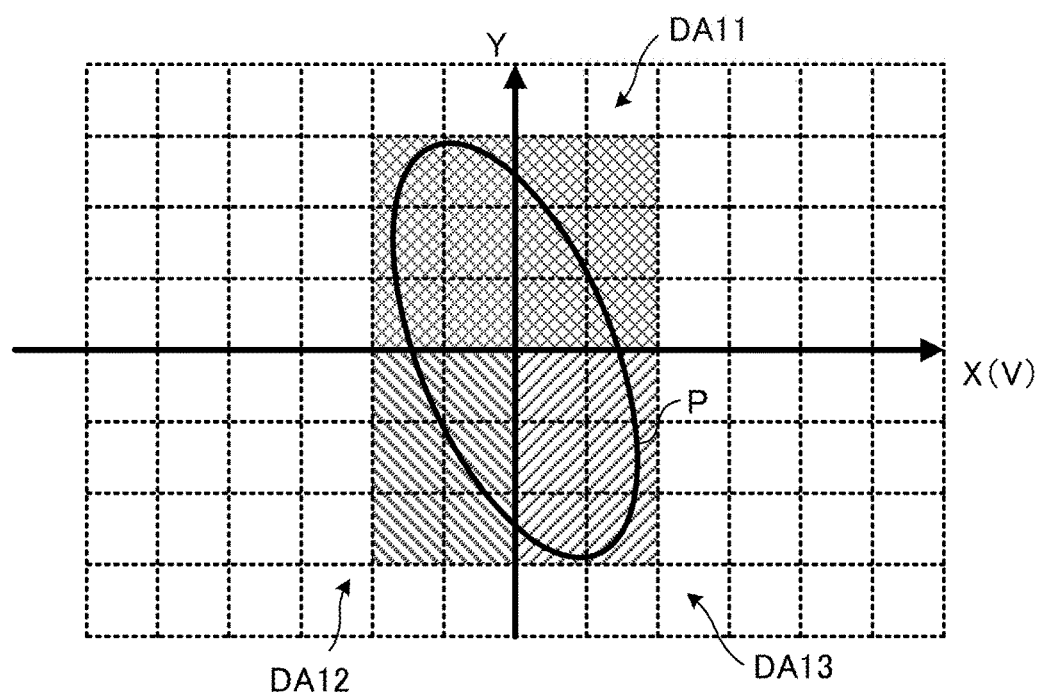
FIG. 6B illustrates example divided areas.

The divided areas DA described in FIG. 1 will be described in more detail below by referring to FIGS. 6B and 6C. FIG. 6B illustrates example divided areas DA, and FIG. 6C is a table of setting items of the divided areas DA. The radiation locus P illustrated in FIG. 6B is identical to the radiation locus P illustrated in FIG. 6A. The graph illustrated in FIG. 6B and the table illustrated in FIG. 6C are displayed on the terminal device 30 illustrated in FIG. 4.

First, example divided areas DA will be described by referring to FIG. 6B. As illustrated in FIG. 6B, each of the divided areas DA is an area defined by combinations of two X coordinates and two Y coordinates. More specifically, in FIG. 6B, broken lines are drawn at predetermined spatial intervals, and the divided area DA is segmented by the broken lines. The intervals between the broken lines may be set any of other dimensions. In another possible embodiment, these broken lines may be omitted, and the divided area DA may be defined by any X and Y coordinates.

In the embodiment of FIG. 6B, the radiation locus P is divided into divided area DA11, divided area DA12, and divided area DA13. The divided area DA11 has a positive Y coordinate. The divided area DA12 has a negative X coordinate and a negative Y coordinate. The divided area DA13 has a positive X coordinate and a negative Y coordinate. This dividing processing is performed by the divider 111b based on the attribute information 112a, as illustrated in FIG. 4.

In the divided area DA11, the adjuster 111c (see FIG. 4) makes the locus velocity LV of laser constant and makes the output of laser constant. The same applies in the divided area DA12 and the divided area DA13.

By referring to FIG. 6C, setting items of the divided areas DA will be described. In FIG. 6C, the divided area DA11 illustrated in FIG. 6B is denoted "A1", the divided area DA12 illustrated in FIG. 6B is denoted "A2", and the divided area DA13 illustrated in FIG. 6B is denoted "A3". In the following description, "A1" will be referred to as area A1, "A2" will be referred to as area A2, and "A3" will be referred to as area A3. Also in FIG. 6C, setting items are listed in columns.

As illustrated in FIG. 6C, the setting items include: "$x_{min}$", which indicates a minimal value of the X coordinate; "$y_{min}$", which indicates a minimal value of the Y coordinate; "$x_{max}$", which indicates a maximum value of the X coordinate; and "$y_{max}$", which indicates a maximum value of the Y coordinate. These values may be automatically set by the divider 111b based on the attribute information 112a. Another possible embodiment is that the attribute information 112a is displayed on the terminal device 30 so that the terminal device 30 accepts an operation to change a value(s) or an operation to input a new value(s).

As illustrated in FIG. 6C, the setting items further include: "Locus velocity", which indicates the locus velocity LV of laser; "Intensity", which indicates laser intensity; "Frequency", which indicates laser frequency; and "Duty", which indicates laser duty ratio.

Specifically, the setting item "Intensity" indicates an output value of laser measured under the condition that laser is at any time ON. That is, "Intensity" indicates power. The setting item "Frequency" indicates the inverse (reciprocal) of the period of laser's ON and OFF. The setting item "Duty" indicates the ratio (in terms of percent, for example) of the ON period of laser to the period of laser's ON and OFF. These values are input at the terminal device 30.

In the area A1 and the area A2, there are no ON-OFF repetitions of laser. Referring to the rows of the area A1 and the area A2 illustrated in FIG. 6C, predetermined values are set at "Intensity" and "0" is set at "Frequency" and "Duty". With "0" set at "Frequency", laser is at any time ON, meaning that there is no concept of "Duty" in the first place. In actual processing situations, therefore, the value set at "Duty" is disregarded. In the area A3, laser is repeatedly turned ON and OFF. Referring to the row of the area A3 illustrated in FIG. 6C, a predetermined value is set at "Intensity" and values other than zero are set at "Frequency" and "Duty".

By referring to FIG. 7, a procedure for processing performed by the robot system 1 will be described. FIG. 7 is a flowchart of a procedure for processing performed by the robot system 1. As illustrated in FIG. 7, the obtainer 111a of the head controller 110 obtains the attribute information 112a of the workpiece W through the robot controller 20 (step S101).

Based on the attribute information 112a, the divider 111b of the head controller 110 divides the shape of the radiation locus P (step S102). The adjuster 111c of the head controller 110 adjusts the output situation in which laser is being output in each of the divided areas DA (on an individual-divided-area-DA basis) (step S103). As used herein, the output situation refers to at least one of the locus velocity LV of laser and the output of laser from the head 100.

The head controller 110 receives, through the terminal device 30, a setting of the relative angle between the movement direction V and the representative direction PV (step S104). The head controller 110 also receives, through the terminal device 30, a choice of the shape of the radiation locus P (step S105). The contents received at steps S104 and S105 are reflected in the setting information 112b. Steps S104 and S105 correspond to the setting step recited in the appended claims.

Next, the head controller 110 communicates with the robot controller 20 to determine whether machining has started (step S106). When machining has started (Yes at step S106), the obtainer 111a obtains the movement direction V of the head 100 (step S107). When the condition at step S106 is not satisfied (No at step S106), the determination processing at step S106 is repeated at predetermined time intervals.

Then, based on the movement direction V obtained at step S107, the adjuster 111c determines the representative direction PV of the radiation locus P made by the head 100 (step S108). In this respect, the adjuster 111c uses the output situation adjusted in each of the divided areas DA (on an individual-divided-area-DA basis) at step S103.

This configuration maintains a high level of machining quality even when an attribute of the workpiece W varies from portion to portion of the workpiece W. The above configuration also keeps the relative angle between the movement direction V and the representative direction PV constant, even when the machining line 200 is curved.

Then, the head controller 110 communicates with the robot controller 20 to determine whether machining has ended (step S109). When machining has ended (Yes at step S109), the entire processing ends. When the condition at step S109 is not satisfied (No at step S109), the procedure at and after step S107 is repeated.

As has been described hereinbefore, the laser machining method according to the above-described embodiment uses the head 100 and the robot 10. The head 100 is capable of variably making the shape of the laser radiation locus P. The robot 10 causes the head 100 to move. The laser machining method includes an obtaining step, a dividing step, and an adjusting step. The obtaining step includes obtaining the attribute information 112a, which indicates a distribution of an attribute of the workpiece W in the machined area of the workpiece W. The dividing step includes dividing the shape of the radiation locus P into a plurality of divided areas DA. The adjusting step includes adjusting, based on the attribute information 112a, at least one of the locus velocity LV of laser from the head 100 and the output of laser from the head 100 in each of the divided areas DA (on an individual-divided-area-DA basis).

Thus, the laser machining method according to the above-described embodiment includes adjusting the output situation of laser from the head 100 based on the attribute information 112a, which indicates a distribution of an attribute of the workpiece W. This ensures that machining quality is maintained even when an attribute of the workpiece W varies from portion to portion of the workpiece W.

As has been described hereinbefore, the head controller 110 according to the above-described embodiment controls motions of the head 100, which is capable of variably making the shape of the radiation locus P using laser. The head controller 110 includes the obtainer 111a, the divider 111b, and the adjuster 111c.

The obtainer 111a obtains the attribute information 112a, which indicates a distribution of an attribute of the workpiece W in the machined area of the workpiece W. The divider 111b divides the shape of the radiation locus P into a plurality of divided areas DA. The adjuster 111c adjusts, based on the attribute information 112a, at least one of the locus velocity LV of laser from the head 100 and the output of laser from the head 100 in each of the divided areas DA (on an individual-divided-area-DA basis).

Thus, the head controller 110 adjusts the output situation of laser from the head 100 based on the attribute information 112a, which indicates a distribution of an attribute of the workpiece W. This ensures that machining quality is maintained even when an attribute of the workpiece W varies from portion to portion of the workpiece W.

As has been described hereinbefore, the robot system 1 according to the above-described embodiment includes the head 100, the robot 10, and the controller. The head 100 is capable of variably making the shape of the radiation locus P using laser. The robot 10 causes the head 100 to move. The controller is the head controller 110, which controls motions of the head 100. The head controller 110 includes the obtainer 111a, the divider 111b, and the adjuster 111c.

The obtainer 111a obtains the attribute information 112a, which indicates a distribution of an attribute of the workpiece W in the machined area of the workpiece W. The divider 111b divides the shape of the radiation locus P into a plurality of divided areas DA. The adjuster 111c adjusts, based on the attribute information 112a, at least one of the locus velocity LV of laser from the head 100 and the output of laser from the head 100 in each of the divided areas DA (on an individual-divided-area-DA basis).

Thus, the robot system 1 adjusts the output situation of laser from the head 100 based on the attribute information 112a, which indicates a distribution of an attribute of the workpiece W. This ensures that machining quality is maintained even when an attribute of the workpiece W varies from portion to portion of the workpiece W.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A laser machining method, comprising:
   obtaining attribute information indicating a distribution of a physical attribute of a workpiece in a machined area of the workpiece;
   dividing a shape of a radiation locus into a plurality of divided areas; and
   adjusting, based on the attribute information and in each of the divided areas, at least one of a locus velocity of a laser from a head configured to variably make the radiation locus on the workpiece using the laser, and an output of the laser from the head,
   wherein the head is moved by a robot configured to move the head.

2. The laser machining method according to claim 1, wherein the adjusting further comprises adjusting the output of the laser based on a preset intensity of the laser, a preset frequency of the laser, and a preset duty ratio of the laser.

3. The laser machining method according to claim 1, further comprising:
  displaying, using a terminal device, the plurality of divided areas of the shape of the radiation locus divided along axes of a plane on which the workpiece is projected, and a result obtained in the adjusting and obtained in each of the plurality of divided areas.

4. The laser machining method according to claim 3, further comprising:
  displaying, using the terminal device, the plurality of divided areas of the shape of the radiation locus such that a movement direction in which the head is being moved by the robot is parallel to one of the axes of the plane.

5. The laser machining method according to claim 1, wherein the obtaining further comprises obtaining a movement direction in which the head is being moved by the robot, and
  the adjusting further comprises adjusting, based on the movement direction obtained in the obtaining, the radiation locus made by the head to keep a constant relative angle between the movement direction and a representative direction of the shape of the radiation locus.

6. An apparatus configured to control a motion of a head configured to variably make a radiation locus on a workpiece using a laser, comprising:
  circuitry configured to obtain attribute information indicating a distribution of a physical attribute of the workpiece in a machined area of the workpiece, divide a shape of the radiation locus into a plurality of divided areas, and adjust, based on the attribute information and in each of the divided areas, at least one of a locus velocity of the laser from the head and an output of the laser from the head.

7. The apparatus according to claim 6, wherein the circuitry is configured to adjust the output of the laser based on a preset intensity of the laser, a preset frequency of the laser, and a preset duty ratio of the laser.

8. A robot system, comprising:
  a head configured to variably make a radiation locus on a workpiece using laser;
  a robot configured to move the head; and
  an apparatus configured to control a motion of the head and comprising circuitry configured to obtain attribute information indicating a distribution of a physical attribute of the workpiece in a machined area of the workpiece, divide a shape of the radiation locus into a plurality of divided areas, and adjust, based on the attribute information and in each of the divided areas, at least one of a locus velocity of the laser from the head and an output of the laser from the head.

9. The laser machining method according to claim 2, further comprising:
  displaying, using a terminal device, the plurality of divided areas of the shape of the radiation locus divided along axes of a plane on which the workpiece is projected, and a result obtained in the adjusting and obtained in each of the plurality of divided areas.

10. The laser machining method according to claim 9, further comprising:
  displaying, using the terminal device, the plurality of divided areas of the shape of the radiation locus such that a movement direction in which the head is being moved by the robot is parallel to one of the axes of the plane.

11. The laser machining method according to claim 2, wherein the obtaining further comprises obtaining a movement direction in which the head is being moved by the robot, and the adjusting further comprises adjusting, based on the movement direction obtained in the obtaining, the radiation locus made by the head to keep a constant relative angle between the movement direction and a representative direction of the shape of the radiation locus.

12. The laser machining method according to claim 3, wherein the obtaining further comprises obtaining a movement direction in which the head is being moved by the robot, and the adjusting further comprises adjusting, based on the movement direction obtained in the obtaining, the radiation locus made by the head to keep a constant relative angle between the movement direction and a representative direction of the shape of the radiation locus.

13. The laser machining method according to claim 4, wherein the obtaining further comprises obtaining a movement direction in which the head is being moved by the robot, and the adjusting further comprises adjusting, based on the movement direction obtained in the obtaining, the radiation locus made by the head to keep a constant relative angle between the movement direction and a representative direction of the shape of the radiation locus.

14. The laser machining method according to claim 9, wherein the obtaining further comprises obtaining a movement direction in which the head is being moved by the robot, and the adjusting further comprises adjusting, based on the movement direction obtained in the obtaining, the radiation locus made by the head to keep a constant relative angle between the movement direction and a representative direction of the shape of the radiation locus.

15. The laser machining method according to claim 10, wherein the obtaining further comprises obtaining a movement direction in which the head is being moved by the robot, and the adjusting further comprises adjusting, based on the movement direction obtained in the obtaining, the radiation locus made by the head to keep a constant relative angle between the movement direction and a representative direction of the shape of the radiation locus.

* * * * *